D. MOORE.
Revolver.
No. 1,694 Reissued June 7, 1864.
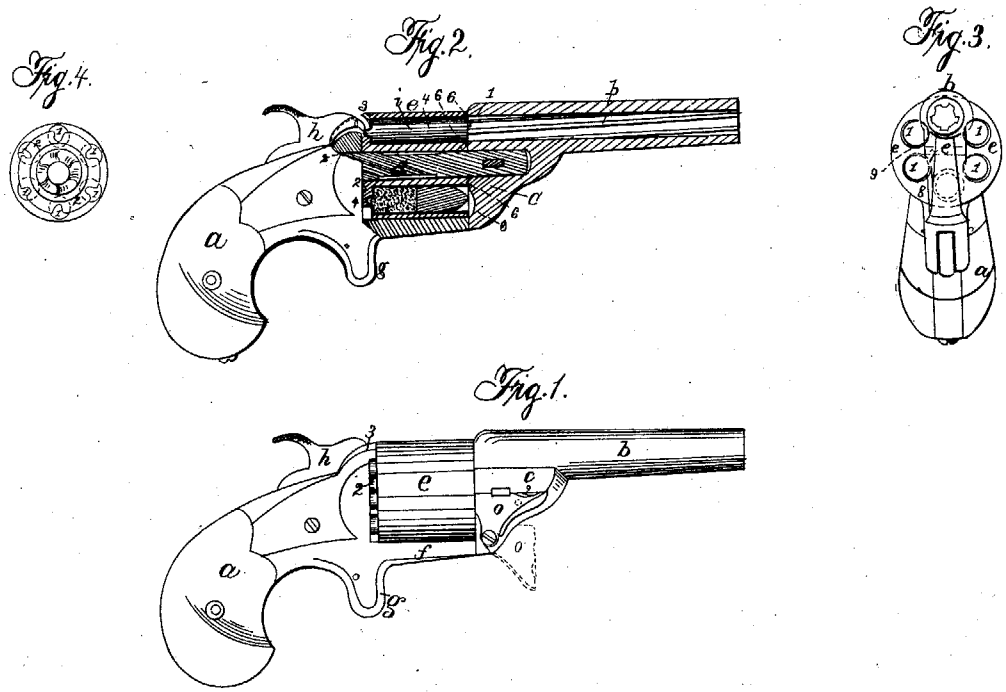
Witnesses
Thos. Geo. Harrold
Chas. H. Smith
J. J. Berger
Orlando
Atty
N. PETERS, PHOTO-LITHOGRAPHER, WASHINGTON, D. C.

UNITED STATES PATENT OFFICE.

DANIEL MOORE, OF BROOKLYN, NEW YORK, ASSIGNOR TO THE MOORE'S PATENT FIRE-ARMS COMPANY, OF SAME PLACE.

IMPROVEMENT IN REVOLVING FIRE-ARMS.

Specification forming part of Letters Patent No. 38,321, dated April 28, 1863; Reissue No. 1,694, dated June 7, 1864.

*To all whom it may concern:*

Be it known that DANIEL MOORE, of Brooklyn, in the county of Kings and State of New York, did invent and make a certain new and useful Improvement in Revolving Fire-Arms; (for which Letters Patent of the United States were duly granted the 28th day of April, 1863, and the entire right therein has been assigned to THE MOORE'S PATENT FIRE-ARMS COMPANY, of Brooklyn aforesaid, as by reference to an instrument recorded in the United States Patent Office, June 1, 1863, in Liber Y[6], page 126, of Transfers of Patents, will more fully appear;) and the following is hereby declared to be a full, clear, and exact description of the said invention, reference being had to the annexed drawings, making part of this specification, wherein—

Figure 1 is a side elevation of said fire-arm. Fig. 2 is a similar view, with the barrel and cylinder in section. Fig. 3 is an end view, and Fig. 4 represents the rear end of the cylinder.

Similar marks of reference denote the same parts.

The nature of this division of the said invention consists in a moving gate that allows for the introduction or removal of the cartridge-cases at the front end of the chambers, and prevents said cases dropping out or sliding forward and becoming obstructed.

In the drawings, *a* is the handle, of any usual character or shape. *b* is the barrel, rifled or plain. *c* is the bracket of the barrel, receiving the center-pin *d*, on which the cylinder *e* revolves. *f* is the arm extending from the handle *a* to the bracket. *g* is the trigger, and *h* the hammer.

The means for rotating the cylinder, the stop to the same, or the construction of the lock form no part of the present invention, as they may be made and act in any usual manner.

The cylinder *e* is formed with chambers 1 1, that do not pass entirely through, but terminate at an abutment, 2, Figs. 1 and 4, at the rear end of the cylinder, which abutment leaves about one-half of the chamber open at the rear end, and this abutment 2, being circular, revolves, with the cylinder *e*, beneath an abutment, 3, projecting from the handle, which abutments 2 and 3 sustain the base of the metallic cartridge-case, when exploded, on the line of the barrel; but the abutment 3 does not extend all around, so that the rear ends of the chambers are partially open for the introduction of a rammer to press out an exploded case, or for observing whether the chamber is loaded or not, and to allow of the removal of dirt from the chamber.

The metallic cartridge-case *i* is formed with a teat or hollow projection, 4, at the center of its base, entering a notch or hole in the abutment 2, and this teat is to be filled with fulminating material and varnished over, or a small piece of paper introduced to keep the gunpowder from contact therewith, and the hammer *h* is formed with a projecting point, 5, that passes through a mortise in the abutment 3 and strikes upon the side of this teat 4 and explodes the fulminate by the compression of the teat against the side of the abutment 2.

In place of the hammer being formed with a point, it may strike upon a small spring-punch, which shall act against the side of the teat.

The forward end of each chamber 1 is recessed to receive the flange or ring 6 around the forward end of the metal cartridge-case, and this flange or ring being larger than the caliber of the barrel, the said case cannot slide forward and become obstructed in the rear end of the barrel, as would sometimes be the case were the metallic case used without this flange or ring.

In order to introduce or withdraw the cartridge-cases, the side of the bracket *c* is recessed, as at 7, which allows free access to one chamber at a time. In this recess the swinging gate *o* is introduced on the center 8. When the same is turned back, as shown by dotted lines in Fig. 1, a cartridge-case can be entered or withdrawn; but when the same is turned up into the recess the end of the gate keeps the cartridges from falling out. A small projection springing into a notch keeps this gate in position when turned up, and a thumb-piece, 9, allows for its being pressed down out of the way when desired.

What is claimed as the invention of the said DANIEL MOORE, and to be secured by Letters Patent, is—

A movable gate applied at the forward end of the cylinder, to retain the metallic cartridge-cases when in the chambers or allow of the introduction or removal of such cases after said gate has been moved aside, substantially as specified.

Dated this 18th day of April, 1864.

A. J. BERGEN, *President.*
H. N. BRUSH, *Secretary p. t.*

Witnesses:
THOS. GEO. HAROLD,
CHAS. H. SMITH.